(12) United States Patent
Vaidyanathan

(10) Patent No.: US 8,468,846 B2
(45) Date of Patent: Jun. 25, 2013

(54) SYSTEMS AND METHODS FOR INDIRECT EVAPORATIVE COOLING AND FOR TWO STAGE EVAPORATIVE COOLING

(75) Inventor: Anandhakrishnan Vaidyanathan, Karnataka (IN)

(73) Assignee: HMX Systems Private Limited, Maharashtra (IN)

( * ) Notice: Subject to any disclaimer, the term of this patent is extended or adjusted under 35 U.S.C. 154(b) by 123 days.

(21) Appl. No.: 13/054,870

(22) PCT Filed: Dec. 29, 2008

(86) PCT No.: PCT/IN2008/000874
§ 371 (c)(1),
(2), (4) Date: Jan. 19, 2011

(87) PCT Pub. No.: WO2010/010576
PCT Pub. Date: Jan. 28, 2010

(65) Prior Publication Data
US 2011/0126564 A1    Jun. 2, 2011

(30) Foreign Application Priority Data

Jul. 22, 2008    (IN) .......................... 1550/MUM/2008

(51) Int. Cl.
*F25D 5/00*    (2006.01)
(52) U.S. Cl.
USPC .......................................................... 62/304
(58) Field of Classification Search
USPC .......................................................... 62/304
See application file for complete search history.

(56) References Cited

U.S. PATENT DOCUMENTS

| | | |
|---|---|---|
| 5,435,382 A | 7/1995 | Carter |
| 5,664,433 A * | 9/1997 | Bourne et al. .................. 62/314 |
| 5,731,081 A | 3/1998 | Esu |
| 5,776,380 A | 7/1998 | Baigas, Jr. |
| 6,523,604 B1 | 2/2003 | Brooks et al. |
| 6,705,096 B2 | 3/2004 | Maisotsenko et al. |

(Continued)

FOREIGN PATENT DOCUMENTS

| | | |
|---|---|---|
| WO | 03091633 A1 | 11/2003 |
| WO | 2004076931 A2 | 9/2004 |
| WO | 2007071796 A1 | 6/2007 |

OTHER PUBLICATIONS

International Search Report for PCT/IN2008/000874 dated Jun. 10, 2009.

*Primary Examiner* — Ljiljana Ciric
*Assistant Examiner* — Alexis Cox
(74) *Attorney, Agent, or Firm* — Burns & Levinson LLP; Orlando Lopez

(57) ABSTRACT

Systems and methods for Indirect Evaporative Cooling and for Two Stage Evaporative Cooling for conditioning fluids such as air are disclosed. The Indirect Evaporative Cooling Systems comprise scalable indirect evaporative heat exchangers formed with polymer substrates that have been treated to render one surface substantially hydrophilic while the other is substantially hydrophobic, with channels for passage of primary (cooled) an secondary (cooling) air streams between them. The Two Stage Evaporative Cooling System comprise an indirect evaporation component where the fluid is pre-cooled indirectly with the abovementioned scalable heat exchangers, followed by a direct evaporation stage where the pre-cooled fluid is further cooled directly by adiabatic evaporative cooling. The device employing these systems is scalable, energy-efficient, uses aseptic materials, filters/clean incoming fluids (e.g. air), circulates disinfected evaporating liquid (e.g. disinfected water and has enhanced performance efficiency.

38 Claims, 12 Drawing Sheets

U.S. PATENT DOCUMENTS

| | | |
|---|---|---|
| 6,776,001 B2 | 8/2004 | Maisotsenko et al. |
| 6,931,883 B2 | 8/2005 | Bourne et al. |
| 2003/0033826 A1* | 2/2003 | Moriguchi et al. ............. 62/315 |
| 2010/0018234 A1* | 1/2010 | Gillan et al. ................. 62/259.4 |

* cited by examiner

ELEVATION / VERTICAL CROSS SECTION

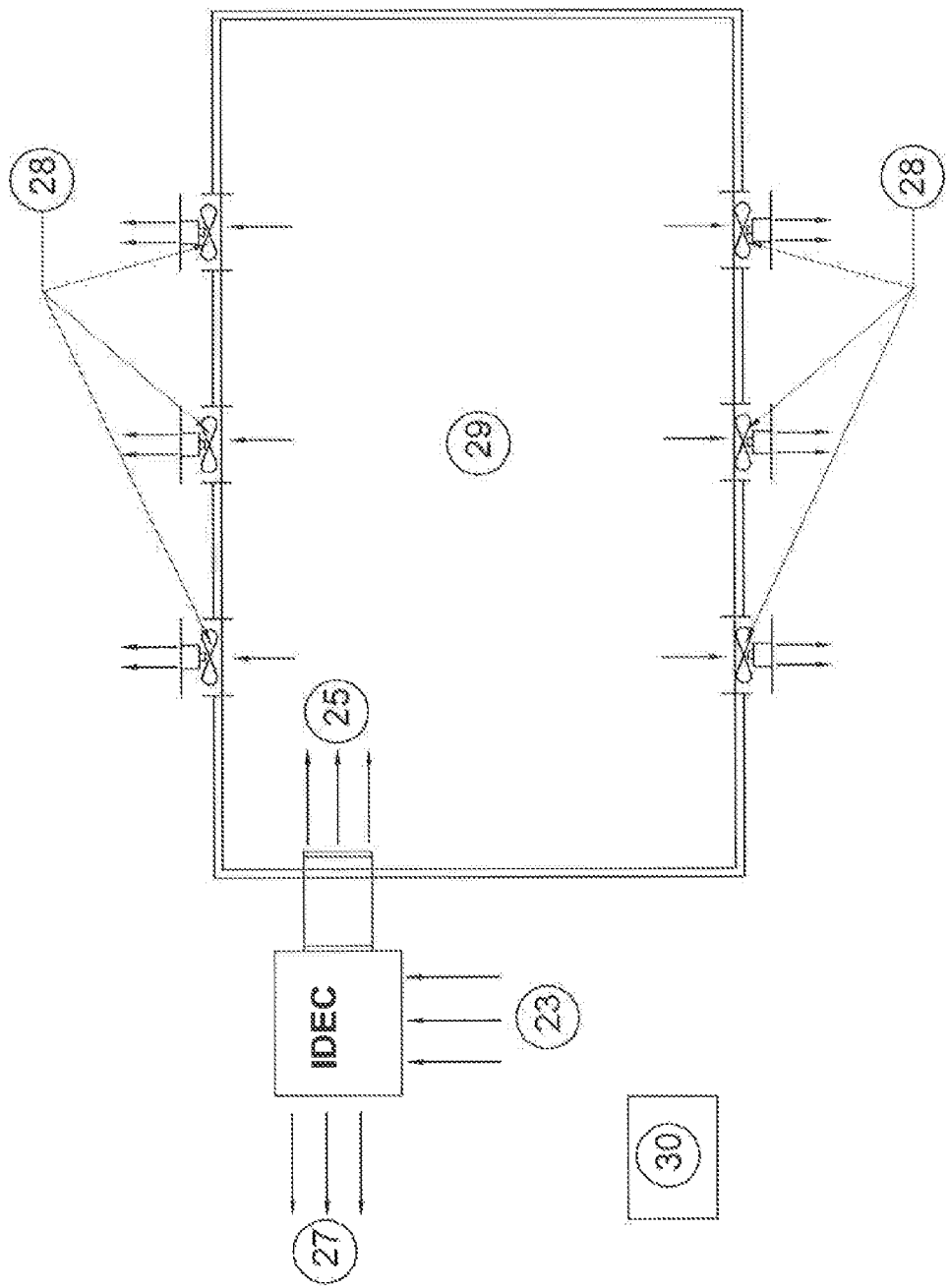

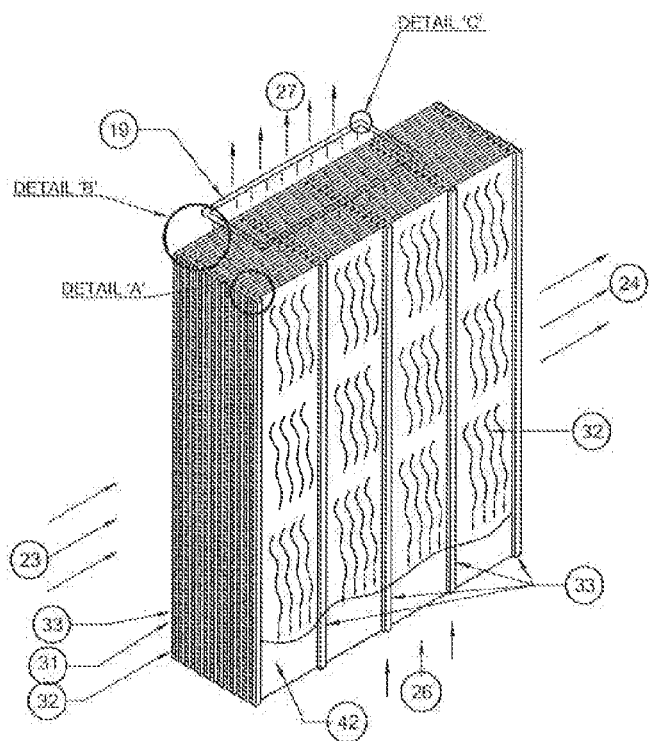
FIG-6a
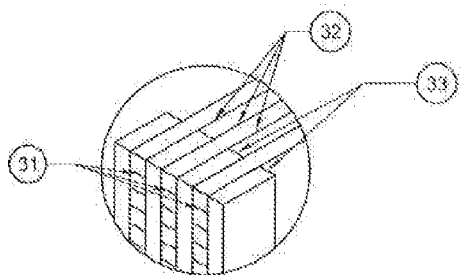
FIG 6b-Detail 'A'
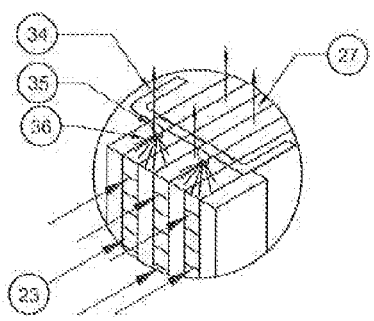
FIG 6c-Detail 'B'
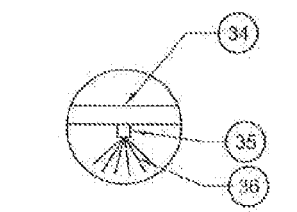
FIG 6d-Detail 'C'

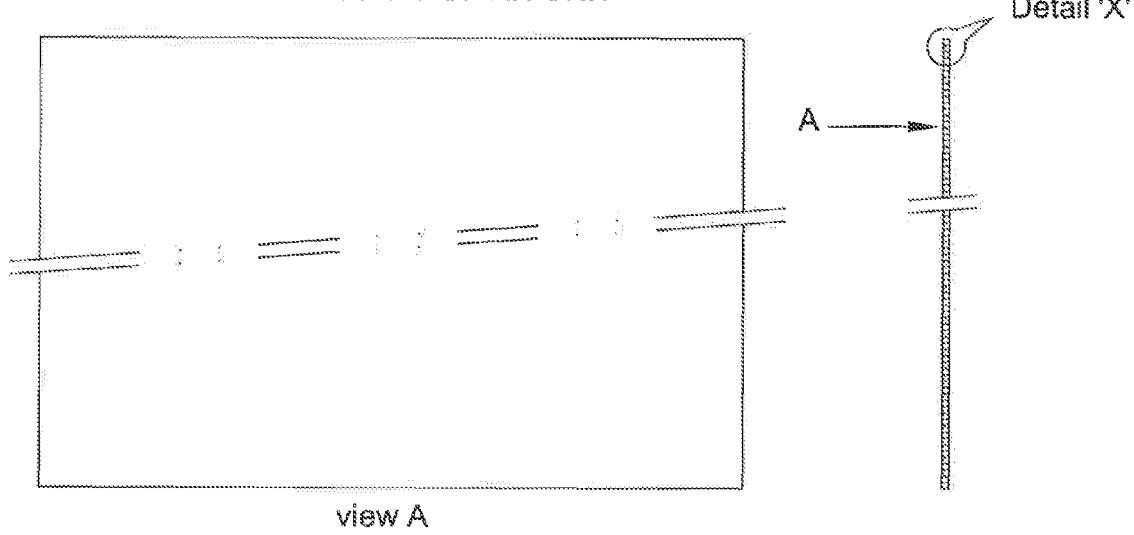
Fig - 7a
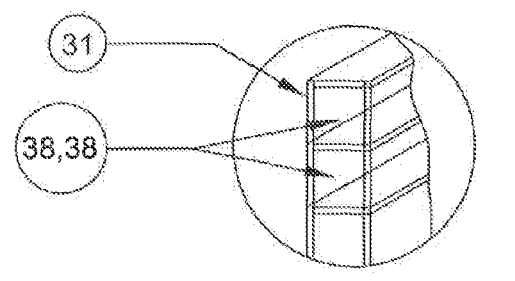
Fig - 7b : Detail 'X'

DIFFERENT VIEWS OF AN UNIT
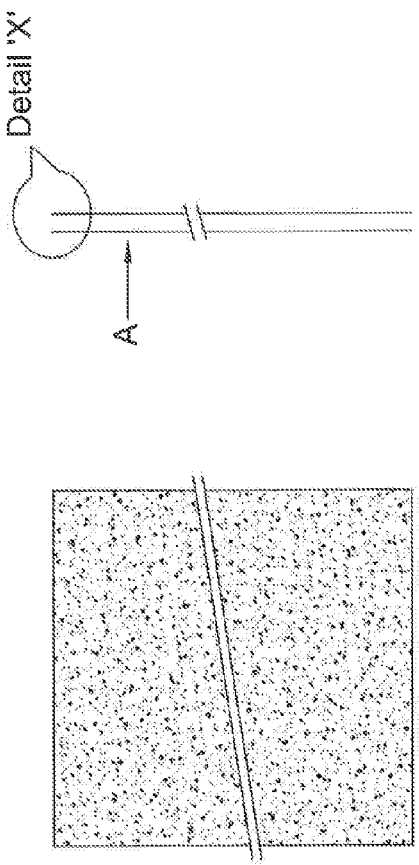
FIG 8a
FIG 8b
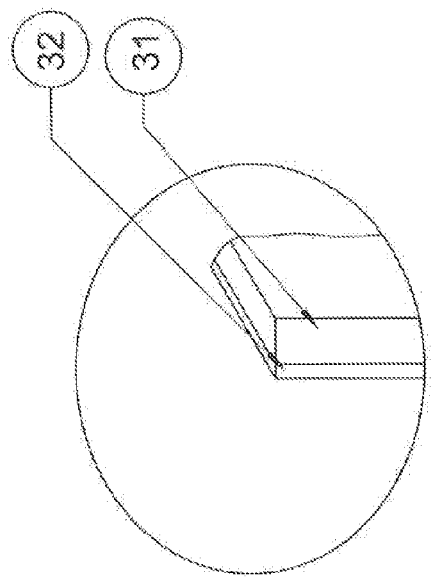
FIG 8c : Detail X

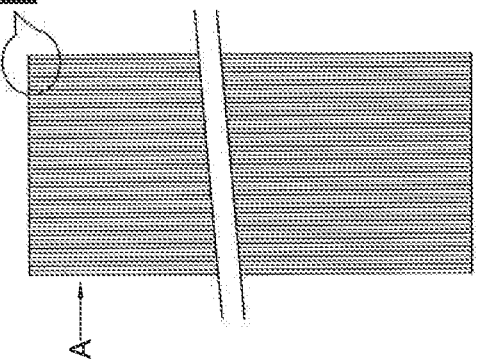
FIG-9d
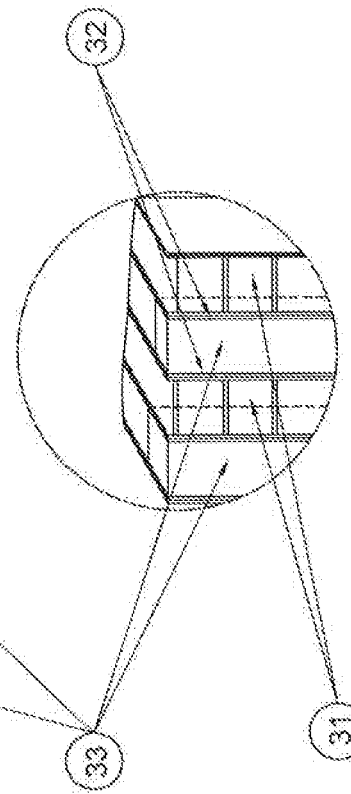
FIG-9e Detail X
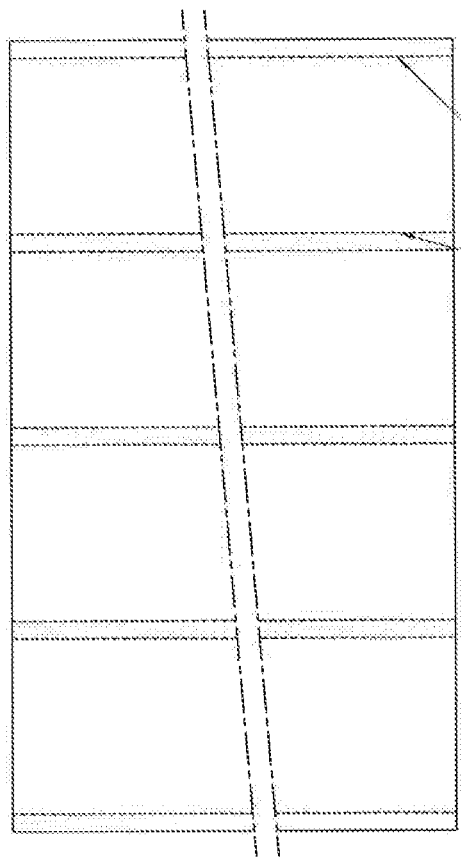
View A
FIG-9c

SYSTEMS AND METHODS FOR INDIRECT EVAPORATIVE COOLING AND FOR TWO STAGE EVAPORATIVE COOLING

CROSS-REFERENCE TO RELATED APPLICATIONS

This application is a U.S. national stage application under 35 U.S.C. 371 of co-pending International Application No. PCT/IN08/00874 filed Dec. 29, 2008 and entitled "SYSTEMS AND METHODS FOR INDIRECT EVAPORATIVE COOLING AND FOR TWO STAGE EVAPORATIVE COOLING", which in turn claims priority to India Patent Application No. 1550/MUM/2008 filed Jul. 22, 2008, both of which are incorporated by reference herein in their entirety for all purposes.

FIELD OF INVENTION

This invention relates to indirect evaporative cooling technology and two-stage evaporative cooling technology, and particularly to indirect-direct evaporative cooling devices used for conditioning fluids such as air.

BACKGROUND AND PRIOR ART

Indirect/direct evaporative coolers (IDEC) are two stage evaporative coolers that are systems deploying "sensible cooling" (described below) without moisture addition in the first stage and evaporative cooling in the second stage.

Sensible cooling is a process by which air is cooled without any change in the absolute humidity or level of water vapour. There is neither any gain nor loss of absolute humidity. As shown in the conventional psychometric chart, FIG. 1, the process of cooling of primary air is shown from point A to Point B. Such sensible cooling is achieved by having another stream of secondary air taking the path from C to D. As the secondary air stream is made to flow in alternate wet channels having thin 'water film' formed over treated surface, it collects moisture due to vaporisation of water film and a rise in its temperature. This process is depicted from point C to D in FIG. 1.

IDEC can substitute conventional vapor compression indoor air conditioning systems in dry to moderately dry climates because of three primary advantageous features:
1. Energy Efficient
   IDEC units do not use a refrigerant compressor and are thus significantly more energy efficient than conventional air conditioning systems.
2. Higher Cooling Capacity
   Further, IDEC units being a two-stage evaporative system in comparison to conventional single stage (i.e. direct) evaporative coolers can have more cooling capacity.
3. Reduced Moisture
   IDEC units add less moisture to the conditioned space thereby providing better indoor environment and comfort of occupants.

All the above three assist in mitigating the environmental damage associated with conventional air conditioning systems.

Indirect evaporative cooling is typically accomplished by passing two air streams through a system comprising thin parallel heat exchange plates with alternating dry and wet passages. Primary airstream, to be cooled, is passed through the dry passages; simultaneously, a secondary airstream is passed through the parallel wet passages. The available temperature gradient between the primary and secondary air streams on either sides of the thin parallel plate drives the heat flow from primary air side to secondary air side. The secondary air stream comes in direct contact with the water film formed due to fine spray of water on the surfaces of the heat exchange plates on wet side. Water film vaporises by extracting the required latent heat there by cooling the plates. Thus the primary air stream is cooled by contact with the dry surfaces of the cooled plates, as heat is transferred from the warmer dry side to the evaporatively-cooled wet side. In a typical IDEC design, the primary airstream is further cooled, downstream of the indirect evaporative stage, in a direct evaporative cooling stage before entering a building as cool supply air.

DESCRIPTION OF RELATED ART

In the Area of Two Singe Evaporative cooling there are various conventional technologies. The technologies that have been developed in this domain can be cited more particularly in U.S. Pat. Nos. 6,931,883 (the '833 patent) and U.S. Pat. No. 5,664,433 (the '433 patent).

In the '433 patent there is a limitation of 'straddle Supply duct' which is used for the fixing or the installation of the machine. Also, the plate structure disclosed in the '433 patent may be difficult to scale up.

The '883 patent has a limitation in-scaling up as the entire Heat exchanger is thermoformed and is formed of a molded cabinet.

In both ('433 and '883) patents there is a limitation of clean air as there are no filters as well as the conditions present are not aseptic.

There is a need for IDEC systems that are scalable, energy-efficient, use aseptic materials, do not require clean-fluid (for example, air), circulate disinfected evaporating liquid (for example, disinfected water) and have enhanced performance efficiency.

STATEMENT OF THE INVENTION

In one embodiment, the present invention provides an indirect evaporative heat exchanger including one or more modules, where each module includes a number of units. Each unit has two polymer substrates, one surface of each substrate having been rendered substantially hydrophilic and other surface of each substrate being substantially hydrophobic. The two substrates are adjacent to one another and have a number of channels disposed between them; the channels being attached to the hydrophobic surface of each of the substrates. At each substantially hydrophilic surface, a substantially compliant nonwoven material is disposed on and substantially fixedly attached to the surface at a number of locations.

Two or more polymer strips are interposed between two adjacent units. The two or more polymer strips serve to fixedly secure together (for example, but not limited to, by the use of adhesive) the two adjacent units. A module is formed by repeating the above described process; that is, fixedly securing together adjacent units.

An embodiment of the method of this invention includes forming one of a number of units by rendering one surface of each of two polymer substrates substantially hydrophilic; the other surface of each of the two polymer substrates being substantially hydrophobic. A number of channels are disposed between the two hydrophobic surfaces; the channels being attached to each of the two hydrophobic surfaces. At each of the hydrophobic surfaces, a substantially compliant nonwoven material is attached, at a number of locations, to each hydrophobic surface. Each unit is fixedly secured to a next unit by interposing two or more polymer strips between the two units. There to a more polymer strips are secured to each of the two units (in one instance, by means of an adhesive).

An embodiment of the method of this invention enables providing a scalable indirect evaporative cooling component, which can be used in an Indirect evaporative cooling apparatus, where the method includes providing a number of the modules described hereinabove and fixedly attaching, in a predetermined configuration one module to one or more other modules. The modular nature of the embodiment of the indirect evaporative cooling component (heat exchanger) disclose hereinabove results in a scalable indirect evaporative cooling component Another embodiment of this invention provides an indirect/direct evaporative cooling apparatus (IDEC) including an indirect evaporative heat exchanger (cooling component) of this invention as disclosed hereinabove and a direct evaporative cooling component (such as, but not limited to, a conventional Celdek™ heat exchanger).

During operation, and evaporative liquid (for example, water) is distributed to each of the substantially compliant nonwoven materials that disposed on each of the hydrophilic surfaces of the indirect evaporative heat exchanger. A secondary fluid (in one instance, secondary air) flows within the space separating, by means of the polymer strips, each two adjacent units. Heat is exchanged between the evaporative liquid and the secondary fluid. A primary fluid (in one instance, primary air) flows through the channels that are disposed between the hydrophobic surfaces of the two polymer substrates in each unit. Upon exiting the indirect evaporative heat exchanger, the primary fluid is provided to the direct evaporative cooling component. Evaporative liquid (such as water) is also distributed to the direct evaporative cooling component. In one instance, a portion of the primary fluid, after flowing through the direct evaporative cooling component, is the source of the secondary fluid. Embodiments in which a portion of the primary fluid, after flowing through the indirect evaporative heat exchanger, provides a source of the secondary fluid are also within the scope of this invention.

Other detailed embodiments of the system and the method of this invention are disclosed herein below.

OBJECTS OF THE INVENTION

The present invention meets the needs identified in the above description of related art as well as meeting other needs.

It is an object of the present invention to provide a scalable indirect evaporative cooling component, resulting in a scalable indirect/direct evaporative cooling component It is also an object of the present invention to provide an indirect evaporative cooling component (heat exchanger) which utilizes materials that do not promote harmful fungus in/bacterial growth It is also an object of the present invention to achieve two-stage evaporative cooling at lower cost and at higher efficiency.

It is another object of the Invention to provide for a processor to control and enhance the energy and performance efficiency of the two-stage evaporative cooling apparatus of this invention.

It is another object of the Invention to provide a liquid disinfection system that receives the evaporative liquid in order to disinfect the circulating evaporating liquid in the evaporative cooling apparatus of this invention.

Yet another object of the Invention is to have filters and aseptic materials to provide a clean and hygienic comfort cooling in the two-stage evaporative cooling apparatus of this invention while providing ease of maintenance.

BRIEF DESCRIPTION OF THE DRAWINGS

For a better understanding of the present invention reference is made to the accompanying drawings and detailed description.

FIG. 5 is a Schematic representation of Exhaust air system of living space for application or an embodiment of the two-stage evaporative cooling apparatus of this invention;

FIGS. 6a, 6b, 6c and 6d are Isometric views of an embodiment of the indirect evaporative heat exchanger of this invention, which depicts a Cross flow type of heat exchanger;

FIGS. 7a and 7b are views of an embodiment of our unit of an embodiment of the indirect evaporative heat exchanger of this invention;

FIGS. 8a, 8b and 8c are a top view (8a), a side view (8b), and an isometric view (8c) of a portion of a component of an embodiment of the indirect evaporative heat exchanger of this invention;

FIGS. 9a through 9e depict an isometric view—of embodiments of a module and a cartridge in an embodiment of the indirect evaporative heat exchanger of this invention; FIGS. 9a-9e correspond to Cross flow heat exchanger;

STATEMENT OF INVENTION

Figure 1:
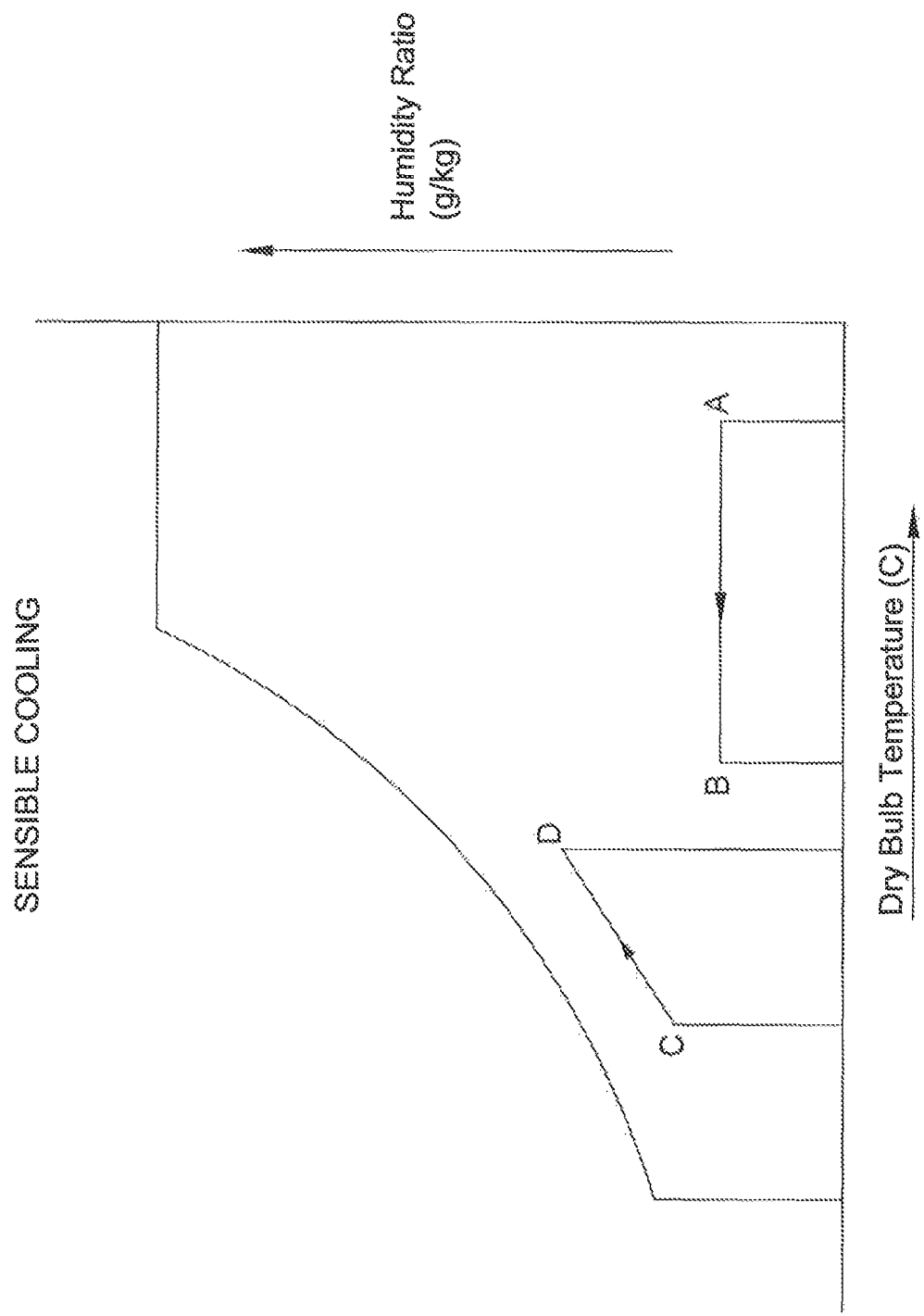
FIG. 1 is a conventional Psychometric chart showing the thermodynamic processes of primary and secondary air streams in a sensible heat exchanger.

The invention relates to a two stage evaporative cooling apparatus comprising a direct evaporative cooling component; and an indirect cooling component comprising at least one module, said at least one module comprising a plurality of units, each unit from at least two of said plurality of units comprising a first polymer substrate; one surface of said first polymer substrate being rendered substantially hydrophilic; another surface of said first polymer substrate being substantially hydrophobic; a second polymer substrate; one surface of said second polymer substrate being rendered substantially hydrophilic; another surface of said second polymer substrate being substantially hydrophobic; said first polymer substrate and said second polymer substrate being adjacent one another and having a plurality of channels disposed between and attached to said another surface of said first polymer substrate and said another surface of said second polymer substrate; a first substantially compliant nonwoven material being disposed on and substantially fixedly attached at a plurality of locations on said one surface of said first polymer substrate; and a second substantially compliant nonwoven material being disposed on and substantially fixedly attached to at another plurality of locations on said one surface of the second polymer substrate; and at least two polymer strips interposed between and fixedly securing together two adjacent units from said at least two units from said plurality of units such that said two adjacent units are separated one from another; whereby during operation, an evaporative liquid is distributed to said first and second substantially compliant nonwoven material of each unit and a secondary fluid is conducted within a space separating each of said units with heat being exchanged between said evaporative liquid and said secondary fluid, and a primary fluid being conducted through at least some channels from said plurality of channels; said primary fluid being provided to the direct evaporative cooling component; during operation, another evaporative liquid is distributed to the direct evaporative cooling component with heat being exchanged between said another evaporative liquid and said primary fluid; a portion of said primary fluid, after flowing through at least said indirect cooling component, is provided to said indirect cooling component as said secondary fluid; the direct evaporative component being positioned downstream from said indirect cooling component and receiving at least another portion of said primary fluid from said indirect cooling component. The invention also relates to a method for providing a scalable indirect cooling component in an evaporative cooling apparatus, the method comprising the steps of providing a number of modules, each module from the number of modules comprising a plurality of units, each unit from at least two of said plurality of units comprising a first polymer substrate; one surface of said first polymer substrate being rendered substantially hydrophilic; another surface of said first polymer substrate being substantially hydrophobic; a second polymer substrate; one surface of said second polymer substrate being rendered substantially hydrophilic; another surface of said second polymer substrate being substantially hydrophobic; said first polymer substrate and said second polymer substrate being adjacent one another and having a plurality of channels disposed between and attached to said another surface of said first polymer substrate and said another surface of said second polymer substrate; a first substantially compliant nonwoven material being disposed on and substantially fixedly attached at a plurality of locations on said one surface of said first polymer substrate; and a second substantially compliant nonwoven material being disposed on and substantially fixedly attached to at another plurality of locations on said one surface of the second polymer substrate; and at least two polymer strips interposed between and fixedly securing together two adjacent units from said at least two units from said plurality of units such that said to adjacent units are separated one from another; fixedly attaching, in a predetermined configuration, said each module to at least another module from the number of modules; said number of multiple modules forming a cartridge; whereby a scalable indirect cooling component is obtained, scalability being obtained by the number of cartridges. The invention also relates to a heat exchanger comprising at least one module, said at least one module comprising a plurality of units, each unit from at least two of said plurality of units comprising a first polymer substrate (31); one surface of said first polymer substrate being rendered substantially hydrophilic; another surface of said first polymer substrate being substantially hydrophobic; a second polymer substrate (31); one surface of said second polymer substrate being rendered substantially hydrophilic; another surface of said second polymer substrate being substantially hydrophobic; said first polymer substrate and said second polymer substrate being adjacent one another and having a plurality of channels disposed between and attached to said another surface of said first polymer substrate and said another surface of said second polymer substrate; a first substantially compliant nonwoven material (32) being disposed on and substantially fixedly attached at a plurality of locations on said one surface of said first polymer substrate; and a second substantially compliant nonwoven material (32) being disposed on and substantially fixedly attached to at another plurality of locations on said one surface of the second polymer substrate; and at least two polymer strips (33) interposed between and fixedly securing together two adjacent units from said at least two units from said plurality of units such that said to adjacent units are separated one from another; whereby, during operation, an evaporative liquid is distributed to said first and second substantially compliant nonwoven material of each unit and a fluid is conducted within a space separating each of said units with heat being exchanged between said evaporative liquid and said fluid, and another fluid being conducted through at least some channels from said plurality of channels. The invention also relates to a method for forming a heat exchanger, the method comprising the steps of forming at least one module by the steps of: forming at least two units, each unit from said at least two units being formed by the steps of rendering one surface of a first polymer substrate substantially hydrophilic by treating said one surface of the first polymer substrate by a method selected from plasma discharge, plasma jet, flame treatment and acid etching; another surface of said first polymer substrate being substantially hydrophobic; rendering one surface of a second polymer substrate substantially hydrophilic by treating said one surface of the second polymer substrate by a method selected from plasma discharge, plasma jet, flame treatment and acid etching; another surface of said second polymer substrate being substantially hydrophobic; disposing a plurality of channels between said another surface of said first polymer substrate and said another surface of said second polymer substrate; said plurality of channels being attached to said another surface of said first polymer substrate and to said another surface of said second polymer substrate; fixedly attaching a first substantially compliant nonwoven material at a plurality of locations on said one surface of said first polymer substrate; and fixedly attaching a second substantially compliant nonwoven material at another plurality of locations on said one surface of said second polymer material; and interposing at least two polymer strips between two adjacent units from said at least two units such that the two adjacent units are set by the one from another; and fixedly securing said at least two polymer strips to each one of the two adjacent units.

DETAILED DESCRIPTION OF THE EMBODIMENTS

Embodiments of systems and methods for indirect evaporative cooling and two-stage evaporative cooling are disclosed hereinbelow.

"Compliant" and "compliance", as used herein, refer to the terms as used in the mechanical arts.

In one embodiment, the indirect evaporative cooling heat exchanger of this invention includes one or more modules. Each module includes a number of units. Taking two units from the number of units, each unit from the two units includes a first polymer substrate and a second polymer substrate. In one instance, this invention not being limited to only that instance, the first and second polymer substrates are comprised of an extruded thermoplastic polymer such as extruded polypropylene (PP). One surface of each of the first and second polymer substrates is rendered substantially hydrophilic while the other surface of the first and second polymer substrates is substantially hydrophobic. (Before one surface is rendered substantially hydrophilic, both surfaces of the first and second polymer substrates are substantially hydrophobic.) The rendering of one surface substantially hydrophilic is obtained, in one instance, by Corona treating the surface. In other instances, the surface is rendered substantially hydrophilic by a method such as plasma discharge, plasma jet flame treatment or acid etching. This invention is not limited to only those instances of the method of rendering a surface substantially hydrophilic.

A substantially compliant nonwoven material is disposed on and fixedly attached at a number of locations to the hydrophilic surface of the first polymer substrate. Similarly, substantially compliant nonwoven material is also disposed on and fixedly attached at a number of locations to the hydrophilic surface of the second polymer substrate. The substantially compliant nonwoven material can be a spunbonded material, a melt blown material, hydroentangled (spunlaced) material or made through any other processes such as co-forming, airlaying, wetlaying, carding webs, thermal bonding, needle punching, chemically bonding or combinations thereof. Embodiments of spunbonded material include polyolefin, Polyethylene terephthalate (PET) and nylon. Embodiments of melt blown material include polyolefin, Polyethylene terephthalate (PET) and nylon. Embodiments of hydroentangled material include cotton, rayon or viscose staple fiber, lyocell staple fiber, polyolefin staple fiber, polyester staple fiber and nylon staple fiber.

The embodiment employs nonwoven materials that are typically made from fibers or filaments. Typically, these are made as a very thin web with a very low density described as GSM (grams per square meter). The lower the density, the thinner the nonwoven web. The structure of the nonwoven web used in the embodiment consists of a three dimensional non-uniform arrangement of the fibers/filaments in various orientations.

Nonwoven webs can be formed from fibers and filaments based on hydrophobic or hydrophilic polymers. Representative, but not complete, examples of polymers that are hydrophobic for making nonwoven webs are polyolefins and polyethylene terephthalate. Representative, but not complete, examples of hydrophilic polymers for making nonwoven webs include cellulosic materials like cotton, rayon or viscose etc. The application of the fact that under suitable conditions of porosity, fiber/filament diameter, density (GSM) etc, significant capillary action and wicking of water can occur in a web has been innovatively applied in the invention. The invention innovatively utilizes the porosity of certain porous nonwoven webs that can often be sufficient to enable the easy transport of water and other fluids because of wicking caused by capillary action. The prior art teaches that hydrophilic materials can better hold water. However, in relation to the cooling apparatus, the application of this quality has a disadvantage that in the case of a nonwoven web made from hydrophilic polymers, some of the water will swell the fibers and the rest will go around and over the fibers. This would lose the rigidity in the heat exchanger pads. The prior art teaches that hydrophilic materials can better hold water. However, in relation to the cooling apparatus, hydrophilic non woven would swell, while one of our objectives is to retain the thinnest film of the water to facilitate better heat transfer and evaporation. Porous low density nonwoven webs made from hydrophobic fibers or filaments can transfer water through wicking action. Water can flow along, around and over but not through the hydrophobic polymer fibers. The porosity and associated wicking action by a porous nonwoven web can render the nonwoven web effectively hydrophilic in terms of its capability to be wet and easily spread water even if the fibers or filaments constituting the nonwoven web are made from hydrophobic polymers. The invention thus innovatively employs the materials known to be hydrophobic for the retention of water as required. The invention overcomes the problem in maintaining rigidity of heat exchanger pads due to the use of hydrophilic material, as evidenced by relevant prior art, by employing hydrophobic material.

Examples of fibers that are hydrophobic are polyolefins and polyethylene terephthalate. Porous low density nonwoven webs made from these hydrophobic fibers or filaments can be hydrophilic through wicking action.

The first and second polymer substrates are adjacent to each other and have a number of channels disposed between them. The channels are attached to the hydrophobic surface of the first polymer substrate and to the hydrophobic surface of the second polymer substrate. In one instance, the first and second polymer substrates and the channels disposed between them comprise an extruded polymer unit. It should be noted that other configurations, besides an extruded polymer unit, resulting in first and second polymer substrates and channels disposed between them are also within the scope of this invention. FIGS. 10a, 10b, 10c and 10d depict several configurations (embodiments) of the channels disposed between the hydrophobic surfaces of the substrates.

The two polymer substrates, having channels disposed between and fixedly attaching the two hydrophobic surfaces to each other and having exterior surfaces that have been rendered hydrophilic and having nonwoven material disposed on and fixedly attached at number of locations, comprise one unit. One embodiment of a unit is shown in FIGS. 7a and 7b. Referring to FIG. 7b, two substrates 31 have a number of channels 38 disposed between them.

It should be noted that the steps for producing such unit can be performed in different sequences. The two substrates can have the channels disposed between them and attached to each of two surfaces (the surface is being naturally hydrophobic) and the outside surfaces can be rendered substantially hydrophilic and nonwoven material attached to a number of locations on each of the hydrophilic surfaces. Similarly, the substrate can be rendered hydrophilic and then, the hydrophobic surfaces have the channels disposed between them and attached to each of the two surfaces. This invention is not limited to one of these two methods.

Figure 9A:
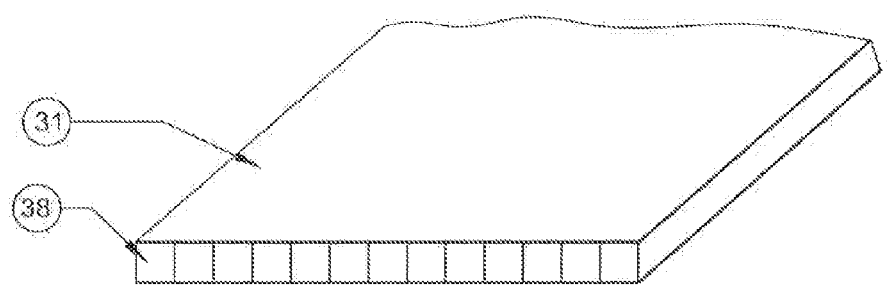

After forming the two or more units, two or more polymer strips are interposed between two units and fixedly secured to each of the hydrophilic surfaces (or equivalently, to the nonwoven material disposed on the hydrophilic surface) of each unit. In one instance, adhesive is disposed between each of the polymer strips and each of the two adjacent units in order to fixedly secure the polymer strip to the hydrophobic surface of each unit. The two units with the two or more polymer strips interposed between them form one module of the heat exchanger. Embodiments of the module of the heat exchanger are shown in FIGS. 9a and 9b.

Figure 9B:
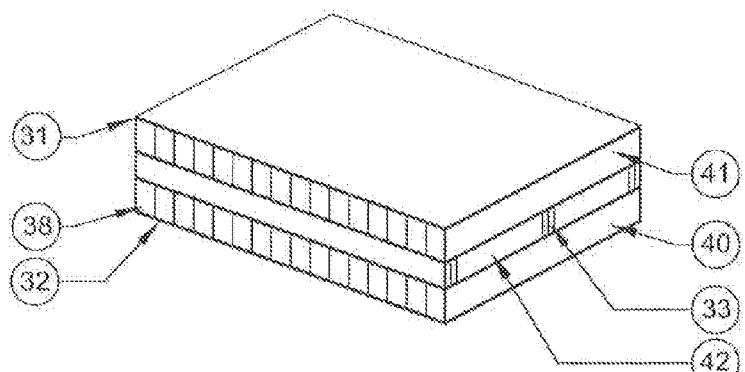
Figure 10A:
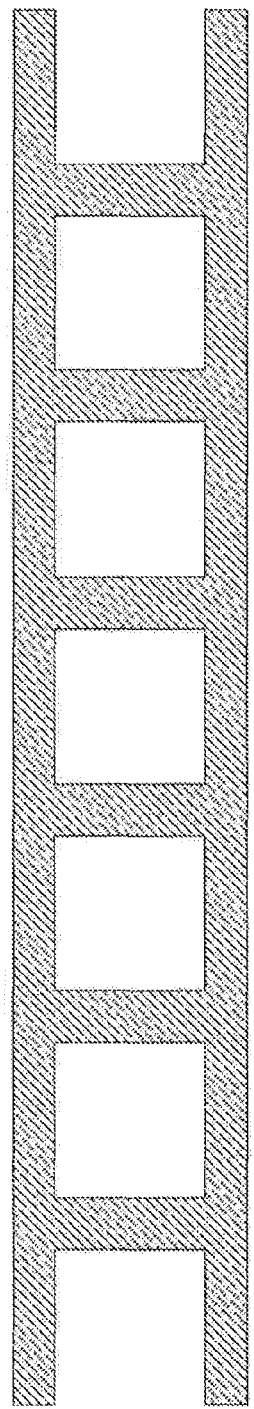
FIGS. 10a, 10b, 10c and 10d are cross-sectional views of several embodiments of channels in an embodiment of the indirect evaporative heat exchanger of this invention.
Figure 10B:
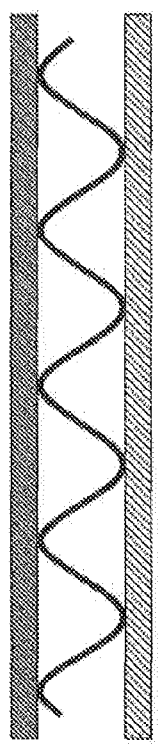
Figure 10C:
Figure 10D:
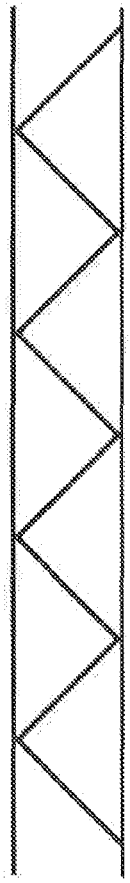

Referring to FIG. 9b, two units 40, 41 have two or more polymer strips 33 separating the two units 40, 41 and fixedly attached to each of the hydrophilic surfaces having the nonwoven material 32 disposed on the surface. The configuration in FIGS. 9a, 9b corresponds to a cross flow heat exchanger. In the cross flow heat exchanger, each channel 38 is disposed substantially perpendicular to each polymer strip 33. The two units 40, 41 with the polymer strips separating the two units 40, 41, the polymer strips being fixedly attached to the nonwoven material 32 disposed on the hydrophilic surface of each of the units 40, 41 form one module of the heat exchanger. A number of modules can be brought together to make a cartridge as referred to in FIGS. 9c, 9d and 9e. A number of cartridges can be assembled together to increase the total capacity in a modular manner. The cartridges can be stacked together or positioned side-by-side (or any other configuration) in a modular manner and fixedly secured (a number of means of fixedly securing the modules, such as adhesive, external structures, etc. are within the scope of the invention) to each other to form a heat exchanger cartridge. Furthermore the cartridges can be stacked together, placed side by side or any other configuration and secured to each other to obtain a heat exchanger. (One embodiment of a heat exchanger cartridge of this invention is shown in FIG. 6a. Although one cartridge could be used as an indirect evaporative cooling heat exchanger in an IDEC as shown in FIG. 6a, two cartridges could be stacked together, one on top of the other, preserving the same primary and secondary fluid flow patterns. In the embodiment where the cartridges are stacked vertically, two cartridges could share one evaporative fluid distribution component. In another embodiment, the cartridges can be kept one beside the other, side by side, thus facilitating modular increase and making a large system. In another embodiment two cartridges are placed one downstream to the other with the primary fluid flowing from one cartridge to the one placed downstream.) It should be noted that providing the number of modules and fixedly attaching, in a predetermined configuration, one module to another module in a number of modules provides a method for providing a scalable indirect evaporative cooling components.

The embodiment (cartridge) shown in FIG. 9d enables scaling up the indirect evaporative cooling component of this invention and scaling up the indirect evaporative cooling component in the evaporative cooling apparatus of this invention. Two units 40, 41 with two or more polymer strips 33 (spacers) interposed between them and fixedly secured to each of the units 40, 41 becomes a module. Each module from a number of modules is fixedly attached to another module, forming a Cartridge. As described hereinabove, although one cartridge could be used as an indirect evaporative cooling heat exchanger in an IDEC, multiple numbers of cartridges can be used to make one indirect evaporative cooling heat exchanger in an IDEC of different dimensions.

During operation, an evaporative liquid is distributed to the substantially compliant nonwoven material of each of the hydrophilic surfaces of the unit and a fluid flows within a space separating each of the units with heat being exchanged between the evaporative liquid and the fluid, and another fluid flowing through at least some channels from the number of channels. The other fluid exchanges heat with the hydrophilic surface. (Heat is transferred from the nonwoven material to the hydrophilic surface and through the substrate to the hydrophobic surface). In one instance, the fluids are air, and the heat exchanger has moist air from the evaporated cooling of the substantially compliant nonwoven material having the evaporative liquid distributed over and dry air flowing through the channels and being cooled. In that instance to a heat exchanger is referred to as a Dry Air, Moist Air (DAMA) heat exchanger.

In one instance, the embodiment of the heat exchanger of this invention described herein above, in order to substantially fixedly attached the substantially compliant nonwoven material to the hydrophilic surface of one of the substrates, a thermoplastic material is disposed at the number of locations at which the nonwoven material is going to be fixedly attached to the hydrophilic surface. The substantially compliant nonwoven material is fusion bonded at the number of locations to the hydrophilic surface. In one embodiment, not a limitation of this invention, the thermoplastic material is low-density polyethylene (LDPE).

In one embodiment, not a limitation of this invention, each one of the first and second polymer substrates 31 has a thickness of at most about 0.12 mm (or, alternatively, 0.12 mm to within engineering tolerances). In one instance, the nonwoven materials have a density of at most about 30 g per square meter (or, alternatively, 30 g per square meter to within engineering tolerances).

In one embodiment, the two-stage evaporative cooling apparatus of this invention includes an indirect evaporative cooling component (heat exchanger) of this invention as described herein above and a direct evaporative cooling component, in one instance, this invention not been limited to only that instance, a CELDEK™ adiabatic direct evaporative heat exchanger. In another embodiment, also not a limitation of this invention, the direct evaporative cooling component is an ultrasonic humidification component (for description of ultrasonic humidifiers, see for example, but not limited to, U.S. Pat. Nos. 4,238,425, 4,031,171, 4,921,639, and US Patent Publication number: US 2007/0007673 AI, all of which are incorporated by reference herein in their entirety)

As disclosed hereinabove, in the indirect evaporative cooling heat exchanger of this invention described herein above, during operation, an evaporative liquid is distributed to the substantially compliant nonwoven material of each of the hydrophilic surfaces of a unit and a secondary fluid flows within a space separating each of the units with heat being exchanged between the evaporative liquid and the fluid. A primary fluid flows through at least some channels from a number of channels. The primary fluid exchanges heat with the hydrophilic surface. (Heat is transferred from the nonwoven material to the hydrophilic surface and through the substrate to the hydrophobic surface). Another evaporative liquid is distributed to the direct evaporative component. The direct evaporative component is positioned downstream from the indirect evaporative cooling component and receives at least a portion of the primary fluid from the indirect evaporative cooling component. In the direct adiabatic evaporative component, the primary fluid is cooled by addition of the other evaporative liquid. During the cooling process in the adiabatic direct evaporative component, there is no change in the total energy or enthalpy, but, a portion of sensible heat of the primary fluid is converted into latent heat.

In one instance, the two-stage evaporative cooling apparatus of this invention includes a primary fluid supply component, located upstream from the indirect evaporative cooling component of this invention and supplying the primary fluid to the indirect evaporative cooling component of this invention. During operation the primary fluid supply component draws ambient fluid through a filtering component and supplies filtered ambient fluid as the primary fluid. The filtering component can include one of a variety of filters (including but not limited to conventional filters, carbon filters, electrostatic filters, etc.). A first evaporative liquid supply system supplies the evaporative liquid to the indirect evaporative cooling component of this invention. A second evaporative liquid supply system supplies the other evaporative liquid to the direct adiabatic evaporative cooling component. In one instance, a liquid holding component (such as a tank) provides a supply of the evaporative liquid and the other evaporative liquid. The first evaporative liquid supply system (a pump in one instance) and the second evaporative liquid supply system (another pump in one instance) are disposed inside the liquid holding component. The first evaporative liquid supply system, the second evaporative liquid supply system and a liquid holding component are comprised of aseptic material. A liquid disinfection system can be disposed to receive the evaporative liquid and the other evaporative liquid and render both of them disinfected. In one embodiment the liquid disinfection system includes a system utilizing ultraviolet (UV) radiation in order to disinfect the evaporative liquid on the other evaporative liquid. It should be noted that other liquid disinfecting systems, such as, but not limited to, system utilizing ozone and other liquid disinfecting systems are within the scope of this invention.

In another instance, the first and second evaporative liquid supply systems include an ultrasonic humidifier that supplies the first and second evaporative liquids in a mist form to the indirect and direct evaporative heat exchanger's (cooling components)

In one instance, the two-stage evaporative cooling apparatus or this invention includes a housing enclosing the filtering component the primary fluid supply component, the liquid holding component the first evaporative liquid supply system, the second operated liquid supply system; the liquid disinfection system and connecting components operatively connecting the systems and other components. The housing and the connecting components are comprised of an aseptic material.

Figure 11:
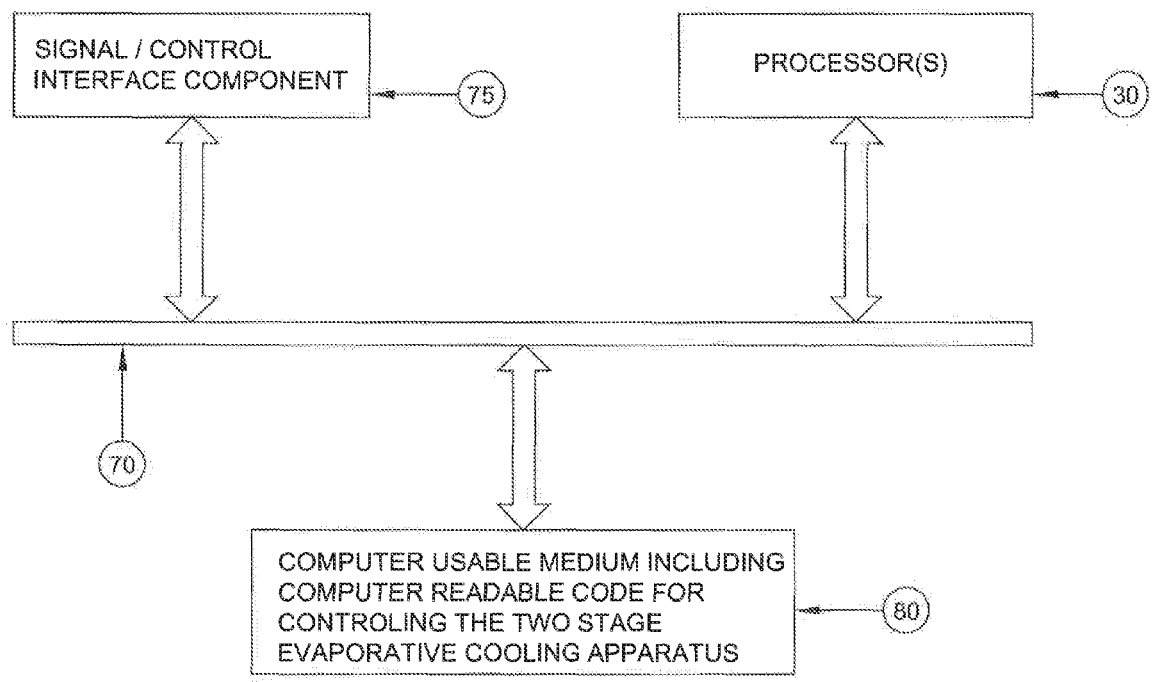
FIG. 11 is a schematic block diagram representation of a component of an embodiment of the two-stage evaporative cooling apparatus of this invention.

In one embodiment, the two-stage evaporative cooling apparatus of this invention is controlled through a controller (in one instance, a microprocessor-based controller although other processor based controllers are within the scope of this invention). In that embodiment, the two-stage evaporative cooling apparatus of this invention includes, as shown in FIG. 11, one or more processors 30 and one or more computer usable media 80 having computer readable code embodied therein to cause the one or more processors to control the apparatus. The one or more processors and the one or more computer usable media are operatively connected by an interconnection component 70 (such as a computer bus). A signal/control interface 75 received/sends signals and control signals from/to monitoring systems/pump drivers/other drivers for the two-stage evaporative cooling apparatus. In one instance, the one or more computer readable media has computer usable code embodied therein for causing the one or more processors to:

obtain data to determine whether there is at least a predetermined amount of liquid in the liquid holding component;

provide, after determining that there is at least the predetermined amount of liquid in the liquid holding component, operating signals to the first evaporative liquid supply component and the second evaporative liquid supply component; the operating signals enabling operation of the first and second evaporative liquid supply components for a predetermined time interval in order to substantially disinfect the evaporative liquid and the another evaporative liquid and in order to distribute the evaporative liquid to the indirect evaporative cooling component and the another evaporative liquid to the direct evaporative cooling component; and provide other operating signals to the primary fluid supply component, the other operating signals enabling operation of the primary fluid supply component in order to supply the primary fluid to the indirect evaporative cooling.

By controlling and enabling operation of the evaporative liquid supply components and in controlling and enabling operation of the primary fluid supply component, the computer readable code can cause the one or more processors 30 to control humidity (by means of controlling the other evaporative liquid supply component) and to control temperature, by also controlling the primary fluid supply component).

In one instance, the primary fluid in two-stage evaporative cooling apparatus of this invention, after flowing through the direct adiabatic evaporative cooling component is provided to an enclosure. The two-stage evaporative cooling apparatus of this invention, in that instance can include an exhaust system for removing fluid from the enclosure. The exhaust system can include, for example, a number of fans. In that instance, the computer usable media can have computer readable code that causes the one or inure processors to provide yet other operating signals to the exhaust system to enable operation of the exhaust system when primary fluid is provided to the enclosure.

In one embodiment, the indirect evaporative cooling component (heat exchanger) of this invention is a cross channel component where the secondary fluid flows, within the space separating each of the units, in a direction substantially perpendicular to a direction in which the primary fluid flows through the channels 38, 39.

In order to better illustrate the present invention, one detailed embodiment is presented below. In the detailed embodiment, the primary fluid and the secondary fluid are both air, referred to as primary air and secondary air, and the evaporative liquid and the other evaporative liquid are both water. While in the embodiments presented hereinbelow detailed dimensions are present, these dimensions are not limitations of this invention.

Figure 2:
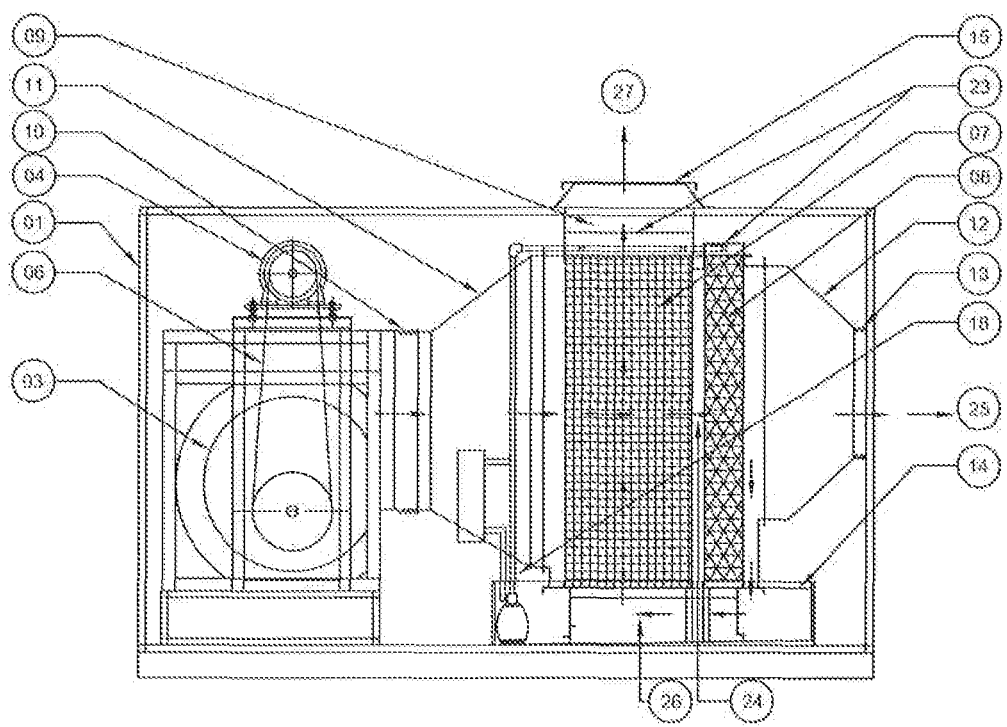
FIG. 2 is a vertical cross sectional schematic view of an embodiment of the two-stage evaporative cooling apparatus of this invention showing main parts of the embodiment.
Figure 3:
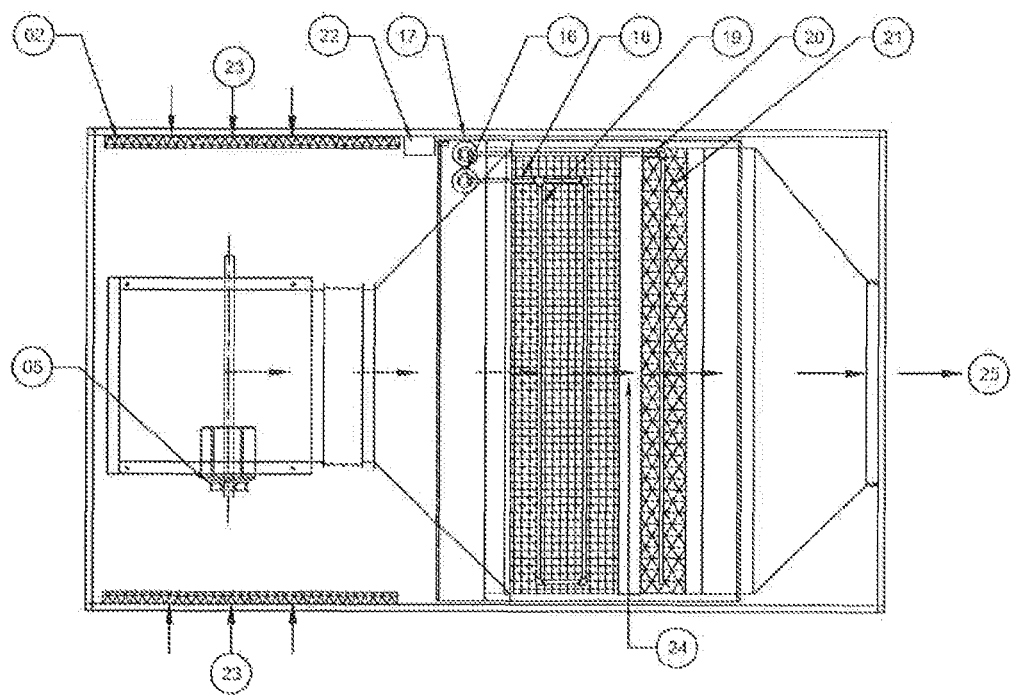
FIG. 3 is a horizontal cross sectional schematic view of the embodiment shown in FIG. 2 showing water distribution, air flow pattern and other parts of the embodiment.

As shown in FIG. 2 (which is the vertical cross sectional schematic view of the embodiment of the invention showing its main parts), and FIG. 3 (which is the horizontal cross sectional schematic view of the embodiment showing water distribution, air flow pattern and other parts), the embodiment is an integrated system, housed in a metallic casing 1 constructed out of weather protected and insulated wall panels to protect against atmospheric corrosion and energy loss to ambient by thermal conduction. The unit comprises the following components:

1. An air propelling system, comprising air filters 2 to remove dust particles, a blower 3, drive motor 4, Pulleys 5 and belts 6

2. A heat exchange system, comprising a first indirect evaporative component (heat exchanger), and embodiment of the indirect evaporative component of this invention, (HE-I) 7, and a second stage heat exchanger (HE-II) 8:

The first stage heat exchanger (HE-I) 7 is an embodiment of a Dry Air Moist Air (DAMA) heat exchanger of this invention, referred to hereinafter as DAMA. The DAMA is a sensible heat exchanger where the main stream of air delivered by the blower, referred to as primary air, is cooled sensibly without any addition of water to it. DAMA heat exchanger could be constructed out of thin walled extruded sections of extruded polymer extruded polypropylene (PP) in this detailed embodiment. In the embodiment shown in FIGS. 2 and 3, the DAMA is a cross flow heat exchanger. DAMA is arranged as first stage air cooling system of the system. To ensure hygienic environment, the DAMA Heat exchangers is housed in an aseptic housing 9 created by using structural Sections made of material such as stainless steel, and located above the water tank 14 made of aseptic material. A stream of air, Secondary air 26 that cools the primary air 23 flows through the DAMA's alternate channels and is exhausted to the atmosphere through Secondary hood 15 provided over HE-I DAMA 7.

DAMA 7 is constructed out of extruded thin walled PP sections like corrugated boards, with a wall thickness preferably of around 0.12 mm or lesser. The substrate prior to treatment is hydrophobic. The substrate unit is shown in FIGS. 8a-8c. The base substrate 31 is 'surface treated' in two stages through a special purpose machine (SPM) to make the surface hydrophilic. In the first stage SPM effects a Corona treatment to enhance the surface energy (also called as surface tension) of the base substrate to increase the adhesion property as well as affinity to water (more hydrophilic). In the second stage, on the corona treated surface, a thin Nonwoven spunbonded fabric 32 typically of density 20 to 30 grams per square meter (gsm) with a layer of LDPE sprayed, is thermally fused on to the base substrate to make it a unit with hydrophilic surface. The thickness of this fused medium is 0.03 mm. Thus the thin walled section becomes a surface of about 0.15 mm or lesser with hydrophilic property (0.12 mm base substrate with 0.03 mm Nonwoven spunbonded PP fabric). On this unit, PP strips 33 (see FIGS. 6b, 6c and 9b) of thickness 2.81 mm are glued on the above the Nonwoven spunbonded fabric. These PP strips 33 give the dimensional rigidity and structural stability to the unit, create turbulence in the secondary air passage there by facilitating greater water evaporation, break the water film by creating turbulence to enable greater evaporation, serve as spacers, acting to create separation, between two units to create a passage for secondary air movement.

The second stage heat exchanger HE-II 8 is an adiabatic heat exchanger (such as, for example, a CELDEK™ heat exchanger) where required amount of moisture is added to cool the primary air to a desired temperature, up to the maximum possible by adiabatic saturation. The second stage heat exchanger HE-II 8 is also housed in an aseptic common housing 9 created by using structural Sections made of aseptic material such as stainless steel, and located above the water tank 14 made of aseptic material.

3. Passages for air:
   Canvas duct-I 10 and Air plenum duct-I 11 connect the blower with DAMA 7. HE-I DAMA 7 and the HE-II 8 are housed in a common housing. Air plenum duct-II 12 and Canvas duct-II 13 connect the air cooling system to the cooled air distribution system of the living space 29 shown in FIG. 5

Figure 4:
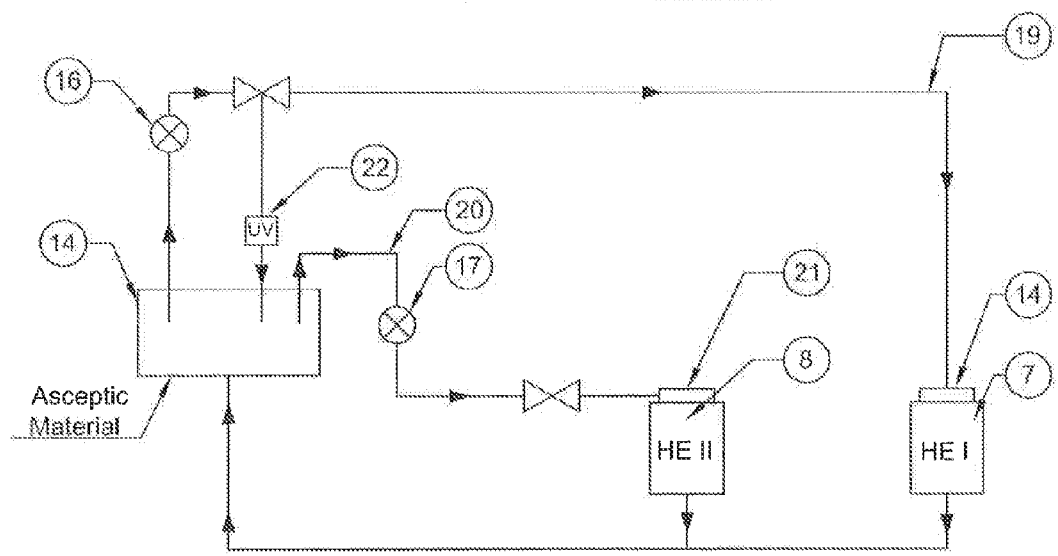
FIG. 4 is a Schematic representation of water distribution system of the embodiment shown in FIG. 2.

4. Water distribution system:
   As shown in FIG. 4, the Water distribution system consists of a submersible pump 16 dedicated to meet the requirements of DAMA 7 and a separate submersible pump 17 dedicated to meet the requirements of HE-II 8. These pumps are made of aseptic material like Stainless steel and are located in the water tank 14 (shown in FIG. 2).
   To achieve better controllability, enhance performance reliability and achieve energy efficiency, DAMA 7 and the adiabatic direct evaporative heat exchanger 8 are provided with independent pumps 16, 17 to distribute varying amount of water at varying pressures 5. Pipes and misting systems:
   As shown in FIG. 3, FIG. 4, FIGS. 6a, 6c and 6d, PVC piping-I 18 and water distribution cartridge 19 fitted with misting Systems are provided to uniformly spray water over HE-I DAMA 7 elements. Similarly PVC piping-II 20 and water distribution cartridge 21 fitted with misting systems are provided to uniformly spray water over HE-II elements. An embodiment of the misting system 35 is shown in FIG. 6d. A close view of the embodiment of water distribution cartridge 19 is shown in FIG. 6d as 34, with the misting system detailed as 35 and the water spray as 36.

6. Water disinfection system:
   As shown in FIG. 3, FIG. 4 an ultraviolet (UV) system 22 is provided to ensure disinfection of the circulating water.

7. Materials
   The Water tank 14 of the apparatus, water pump 16, 17 and piping system component 18, 20 are constructed of aseptic materials and absence of non cellulose materials in unitized cartridges of the DAMA heat exchanger avoid harmful fungus/bacterial growth.

With reference to FIG. 2, FIG. 3, FIG. 4 and FIG. 6a-6d, the working principle of the invention is as explained hereinbelow:

Ambient primary air 23 is drawn across filters 2 of appropriate specification by a blower system comprising a blower 3, motor 4, pulley 5, and belts 6; this blower is connected by a Canvas duct-I 10, to a plenum duct-I 11 for equal distribution of air across HE-I DAMA 7.

HE-I DAMA 7 is an embodiment of the indirect evaporative heat exchanger of this invention that has defined passages for two streams of air 23 and 26 without the two streams coming in contact. One embodiment of the HE-I DAMA 7 is shown in FIGS. 6a and 9d. The main stream of air, primary air 23 is guided along the defined channels/paths. Alternate channels; provide a passage for another stream of air, secondary air 26. These alternate channels provide for water passage in the other direction. As the water flows, they form a film on either side of the alternate passage.

In DAMA 7 heat exchanger primary air 23 is cooled by a second stream of air 26 passing through the alternate passages. The input primary air 23 comes out of the DAMA 7 heat exchanger as sensibly cooled air 24 The secondary air 26 is a part of the primary air 23 which is cooled in stage 1 and stage 2 and is an appropriate percentage boot strapped and routed through the alternate passages of HE I DAMA 7, as shown in FIG. 2. In one instance, the secondary air amounting to, in this embodiment, but not a limitation of this invention, about 40% of the primary air is boot strapped from the main stream primary air after it passed through both the first stage DAMA 7 and second stage heat exchanger 8 and routed through the alternate wet channels to cool the primary air.

This secondary air 26 passes through the alternate passages of DAMA 7 and evaporates the water film formed by the water distribution cartridge 19. Thus the secondary air gains in both in enthalpy and in absolute humidity. The heat required for the evaporation of this water film is obtained from the primary air 23 through thin walls of DAMA 7. Thus the primary air 23 is cooled sensibly by the vaporizing moisture of water film in alternate passages. This secondary air 26 is exhausted through a secondary air hood 15 as secondary outlet air 27.

The Primary air passes horizontally through the defined paths (channels) 38, formed in thin walled extruded poly propylene sections (see FIG. 7). Water flows from top to bottom downwards in the alternate secondary air channels 42 (FIG. 9b) and secondary exhaust air flows from bottom to top, in this secondary channels 42, thus achieving cross flow functionality of the sensible heat exchanger.

As shown in FIG. 2. FIG. 3 and FIG. 4, the submersible pumps 16 and 17 pump water from water tank 14 to distribution cartridges 19, 21 through the Polymer piping 18, 20 to ensure uniform mist of water spray over HE-I DAMA 7 and HE-II 8 respectively. An on line UV system continuously keeps the circulated water in disinfected condition As shown in FIG. 5, filtered and cooled/treated primary air 25 is delivered across the living space 29 to be cooled, which, in turn, picks up heat from the living space 29 and is exhausted out through an exhaust system 28 provided in the closed space 29 to be conditioned.

This entire process is controlled through a pre-programmed microcontroller 30 (see FIG. 11)-based control system that senses the signals and operates/controls the system. When the system is switched on, the controller checks if there is adequate water in the tank 14, upon sufficient level, it switches the pumps 16, 17 on for a defined period, so that the water in the tank is treated by the UV system 22, as well as uniform wetting of the Nonwoven spun bonded fabric in HE-I DAMA 7 Heat exchanger and the medium of HE-II heat exchanger 8. Subsequently it switches the blower 3 on, to blow the filtered air 23 through the heat exchangers.

The pre-programmed micro controller 30 (FIG. 11) controls the functioning of the system in its entirety. As shown in FIG. 5, primary air is delivered to the living space 29 to be cooled. The Micro controller 30 facilitates a pre setting of the desired temperature and relative humidity (hereinafter referred to as Rh) in the living space. As the entire system commences operation, the signal/control interface 75 receives temperature and Rh signals from the space 29. (The micro controller 30 can receive the desired pre-set temperature and Rh.) Based on the pre set conditions versus the actual conditions sensed in living space 29, the micro controller will vary the water flow across the direct heat exchanger if humidity is to be controlled, and vary the air quantity if the temperature is to be controlled. The sensed temperature and Rh signals are compared to the desired preset conditions and the humidity and/or air quantity are varied until the sensed temperature and Rh are substantially equal (within engineering tolerances) to the temperature and/or Rh. Concurrently based on the need, the micro controller would operate the required number of exhaust fans.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, or any other medium from which a computer can read. From a technological standpoint, a signal or carrier wave (such as used for Internet distribution of software or remote management of devices) encoded with functional descriptive material is similar to a computer-readable medium encoded with functional descriptive material, in that they both create a functional interrelationship with a computer. In other words, a computer is able to execute the encoded functions, regardless of whether the format is a disk or a signal.

In one instance, the one or more processors 30 can include server and client processors and the computer usable media can include the necessary software components to implement and support a distributed application such as remote management of the components of the indirect/direct evaporative cooling apparatus of this invention (such software can include, for example, but not limited to, DCOM or CORBA, or Web server/browser and third-party applications, such as, ColdFusion™/ShockWave™).

Although this invention has been described with respect to various embodiments, it should be realized this invention is also capable of a wide variety of further and other embodiments within the spirit and scope of this invention.

I claim:

1. A two stage evaporative cooling apparatus comprising:
a direct evaporative cooling component; and
an indirect cooling component comprising:
at least one module, said at least one module comprising:
a plurality of units, each unit from at least two of said plurality of units comprising:
a first polymer substrate; one surface of said first polymer substrate being rendered substantially hydrophilic; another surface of said first polymer substrate being substantially hydrophobic;
a second polymer substrate; one surface of said second polymer substrate being rendered substantially hydrophilic; another surface of said second polymer substrate being substantially hydrophobic;
said first polymer substrate and said second polymer substrate being adjacent one another and having a plurality of channels disposed between and attached to said another surface of said first polymer substrate and said another surface of said second polymer substrate;
a first substantially compliant nonwoven material being disposed on and substantially fixedly attached at a plurality of locations on said one surface of said first polymer substrate; and
a second substantially compliant nonwoven material being disposed on and substantially fixedly attached to at another plurality of locations on said one surface of the second polymer substrate; and
at least two polymer strips interposed between and fixedly securing together two adjacent units from said at least two units from said plurality of units such that said two adjacent units are separated one from another;
whereby during operation, an evaporative liquid is distributed to said first and second substantially compliant nonwoven material of each unit and a secondary fluid is conducted within a space separating each of said units with heat being exchanged between said evaporative liquid and said secondary fluid, and a primary fluid being conducted through at least some channels from said plurality of channels; said primary fluid being provided to the direct evaporative cooling component; during operation, another evaporative liquid is distributed to the direct evaporative cooling component with heat being exchanged between said another evaporative liquid and said primary fluid; a portion of said primary fluid, after flowing through at least said indirect cooling component, is provided to said indirect cooling component as said secondary fluid;
the direct evaporative component being-positioned downstream from said indirect cooling component and receiving at least another portion of said primary fluid from said indirect cooling component.

2. The two stage evaporative cooling apparatus of claim 1 further comprising:
a primary fluid supply component located upstream from said indirect cooling component and supplying said primary fluid to said indirect cooling component;
a filtering component located at an input to said primary fluid supply component;
during operation, said primary fluid supply component draws ambient fluid through said filtering component and supplies filtered ambient fluid as said primary fluid.

3. The two stage evaporative cooling apparatus of claim 2 further comprising:
a first evaporative liquid supply system supplying said evaporative liquid to said indirect cooling component; and
a second evaporative liquid supply system supplying said another evaporative liquid to said direct evaporative cooling component.

4. The two stage evaporative cooling apparatus of claim 3 further comprising:
a liquid holding component providing a supply of said evaporative liquid and said another evaporative liquid; and
wherein said first evaporative liquid supply system and said second evaporative liquid supply system are disposed inside said liquid holding component;
said first evaporative liquid supply system, said second evaporative liquid supply system and said liquid holding component being comprised of an aseptic material.

5. The two stage evaporative cooling apparatus of claim 4 further comprising: a liquid disinfection system disposed to receive said evaporative liquid and said another evaporative liquid and render said evaporative liquid and said another evaporative liquid disinfected.

6. The two stage evaporative cooling apparatus of claim 5 wherein said liquid disinfection system comprises a system utilizing ultraviolet (UV) radiation in order to disinfect said evaporative liquid and said another evaporative liquid.

7. The two stage evaporative cooling apparatus of claim 5 further comprising a housing enclosing said filtering component, said primary fluid supply component, said liquid holding component, said first evaporative liquid supply system, said second evaporative liquid supply system, said, liquid disinfection system and connecting components, said connecting components operatively connecting, said primary fluid supply component, said liquid holding component, said first evaporative liquid supply system, said second evaporative liquid supply system and said liquid disinfection system; said housing and said connecting components being comprised of an aseptic material.

8. The two stage evaporative cooling apparatus of claim 5 further comprising:
at least one processor; and
at least one computer usable medium having computer readable code embodied therein,
said computer readable code causing said at least one processor to:
obtain data to determine whether there is at least a predetermined amount of liquid in said liquid holding component;
provide, after determining that there is at least said predetermined amount of liquid in said liquid holding component, operating signals to said first evaporative liquid supply component and said second evaporative liquid supply component; said operating signals enabling operation of said first and second evaporative liquid supply components for a predetermined time interval in order to substantially disinfect said evaporative liquid and said another evaporative liquid and in order to distribute said evaporative liquid to said indirect cooling component and said another evaporative liquid to said direct evaporative cooling component; and
provide other operating signals to said primary fluid supply component, said other operating signals enabling operation of said primary fluid supply component in order to supply said primary fluid to said indirect cooling component;
said at least one computer usable medium being operatively connected to said at least one processor.

9. The two stage evaporative cooling apparatus of claim 5 wherein said primary fluid, after flowing through said direct evaporative cooling component is provided to an enclosure;
the two stage, evaporative cooling apparatus further comprising: an exhaust system for removing fluid from the enclosure.

10. The two stage evaporative cooling apparatus of claim 9 wherein said exhaust system comprises a plurality of fans.

11. The two stage evaporative cooling apparatus of claim 5 further comprising:
at least one processor; and
at least one computer usable medium having computer readable code embodied therein,
said computer readable code causing said at least one processor to:
obtain data to determine whether there is at least a predetermined amount of liquid in said liquid holding component;
provide, after determining that there is at least said predetermined amount of liquid in said liquid holding component, operating signals to said first evaporative liquid supply component and said second evaporative liquid supply component; said operating signals enabling operation of said first and second evaporative liquid supply components for a predetermined time interval in order to substantially disinfect said evaporative liquid and said another evaporative liquid and in order to distribute said evaporative liquid to said indirect cooling component and said another evaporative liquid to said direct evaporative cooling component;
provide other operating signals to said primary fluid supply component, said other operating signals enabling operation of said primary fluid supply component in order to supply said primary fluid to said indirect cooling component; and
provide yet other operating signals to said exhaust system, said yet other operating signals enabling operation of said exhaust system when primary fluid is being provided to the enclosure;
said at least one computer usable medium being operatively connected to said at least one processor.

12. The two stage evaporative cooling apparatus of claim 11 further comprising:
at least one interface component receiving/sending signals/control signals; said at least one interface component being operatively connected to, said at least one processor and said at least one computer usable medium;
wherein said computer readable code causes said at least one processor to:
a) receive predetermined temperature and/or Rh values;
b) receive temperature and Rh signals from said at least one interface component;

c) compare the received temperature mid Rh signals to the predetermined temperature and Rh values;
d) vary, based on comparison results, if control of humidity is desired, supply of said another evaporative liquid to t said direct evaporative cooling component;
e) vary, based on comparison results, if control of temperature is desired, supply of the primary fluid;
f) repeat steps b) through e) until the received temperature and/or Rh signals are substantially equal to the predetermined temperature and Rh values; and
g) control operation of said plurality of fans.

13. The two stage evaporative cooling apparatus of claim 1 wherein the direct evaporative component receives said primary fluid from said indirect cooling component and a portion of said primary fluid, after flowing through the direct evaporative component, is provided to said indirect cooling component as said secondary fluid.

14. The two stage evaporative cooling apparatus of claim 13 wherein each channel from said plurality of channels is disposed substantially perpendicular to each of said at least two polymer strips;
whereby said secondary fluid is conducted, within said space separating each of said units, in a direction substantially perpendicular to a direction in which said primary fluid is conducted through said at least some channels.

15. A method for providing a scalable indirect cooling component in an evaporative cooling apparatus, the method comprising the steps of:
providing a number of modules, each module from the number of modules comprising:
a plurality of units, each unit from at least two of said plurality of units comprising:
a first polymer substrate; one surface of said first polymer substrate being rendered substantially hydrophilic; another t surface of said first polymer substrate being substantially hydrophobic;
a second polymer substrate; one surface of said second polymer substrate being rendered substantially hydrophilic; another surface of said second polymer substrate being substantially hydrophobic;
said first polymer substrate and said second polymer substrate being adjacent one another and having a plurality of channels disposed between and attached to said another surface of said first polymer substrate and said another surface of said second polymer substrate;
a first substantially compliant nonwoven material being disposed on and substantially fixedly attached at a plurality of locations on said one surface of said first polymer substrate; and
a second substantially compliant nonwoven material being disposed on and substantially fixedly attached to at another plurality of locations on said one surface of the second polymer substrate; and
at least two polymer strips interposed between and fixedly securing together two adjacent units from said at least two units from said plurality of units such that said to adjacent units are separated one from another;
fixedly attaching, in a predetermined configuration, said each module to at least another module from the number of modules; said number of multiple modules forming a cartridge;
whereby a scalable indirect cooling component is obtained, scalability being obtained by the number of cartridges.

16. A heat exchanger comprising:
at least one module, said at least one module comprising:
a plurality of units, each unit from at least two of said plurality of units comprising:
a first polymer substrate; one surface of said first polymer substrate being rendered substantially hydrophilic; another surface of said first polymer substrate being substantially hydrophobic;
a second polymer substrate; one surface of said second polymer substrate being rendered substantially hydrophilic; another surface of said second polymer substrate being substantially hydrophobic;
said first polymer substrate and said second polymer substrate being adjacent one another and having a plurality of channels disposed between and attached to said another surface of said first polymer substrate and said another surface of said second polymer substrate;
a first substantially compliant nonwoven material being disposed on and substantially fixedly attached at a plurality of locations on said one surface of said first polymer substrate; and
a second substantially compliant nonwoven material being disposed on and substantially fixedly attached to at another plurality of locations on said one surface of the second polymer substrate; and
at least two polymer strips interposed between and fixedly securing together two adjacent units from said at least two units from said plurality of units such that said to adjacent units are separated one from another;
whereby, during operation, an evaporative liquid is distributed to said first and second substantially compliant nonwoven material of each unit and a fluid is conducted within a space separating each of said units with heat being exchanged between said evaporative liquid and said fluid, and another fluid being conducted through at least some channels from said plurality of channels.

17. The heat exchanger of claim 16 wherein a thermoplastic material is disposed, at said number of locations, between said first substantially compliant nonwoven material and said one surface of said first polymer substrate; and wherein said thermoplastic material is disposed, at said another number of locations, between said second substantially compliant nonwoven material and said one surface of said second polymer substrate.

18. The heat exchanger of claim 17 wherein said first substantially compliant nonwoven material is fusion bonded, at said number of locations, to said one surface of said first polymer substrate; and wherein said second substantially compliant nonwoven material is fusion bonded, at said another number of locations, to said one surface of said second polymer subject.

19. The heat exchanger of claim 17 wherein said thermoplastic material comprises low-density polyethylene (LDPE).

20. The heat exchanger of claim 16 wherein said first and second substantially compliant nonwoven materials comprise a spunbonded material.

21. The heat exchanger of claim 16 wherein said first and second substantially compliant nonwoven materials comprise a melt blown material.

22. The heat exchanger of claim 16 wherein said first and second substantially compliant nonwoven materials comprise a hydro-entangled material.

23. The heat exchanger of claim 16 wherein each one of said first and second substantially compliant nonwoven materials has a density of at most about 30 grams per square meter.

24. The heat exchanger of claim 16 wherein each one of said first and second polymer substrates has a thickness of at most about 0.12 mm.

25. The heat exchanges of claim 16 wherein each one of said first and second polymer substrate comprises extruded thermoplastic polymer.

26. The heat exchanger of claim 25 wherein said extruded thermoplastic polymer comprises extruded polypropylene (PP).

27. The heat exchanger of claim 16 wherein said at least two units comprise all units from said plurality of units.

28. The heat exchanger of claim 16 wherein adhesive is disposed between each one of said at least two polymer strips and, at a location wherein each one of said at least two polymer strips is fixedly secured to each one of said at least two polymer strips, to each one of said two adjacent units in order to fixedly secured together said two adjacent units.

29. A method for forming a heat exchanger, the method comprising the steps of:
   forming a module by the steps of:
      forming a plurality of units, each unit from the plurality of units being formed by the steps of:
         rendering substantially hydrophilic one surface of a polymer substrate; an opposite surface of the polymer substrate being substantially hydrophobic;
         fixedly attaching, at a number of locations, one surface of a nonwoven material to the one surface of the polymer substrate which has been rendered substantially hydrophilic;
      forming a plurality of sub-modules, each sub-module being formed by the step of:
         fixedly attaching polymer strips between another surface of the nonwoven material, said another surface being opposite to the one surface of the nonwoven material, in one unit and another surface of the nonwoven material in another unit;
      providing channels between an (the) opposite surface of the substrate in one submodule and an (the) opposite surface of the substrate in another submodule; and
      providing channels between one submodule and another submodule.

30. The method of claim 29 wherein the step of rendering said one surface of the polymer substrate substantially hydrophilic comprises the step of Corona treating said one surface of the polymer substrate.

31. A method for forming a heat exchanger, the method comprising the steps of
   forming a module by the steps of:
      forming a plurality of units, each unit from the plurality of units being formed by the steps of
         rendering substantially hydrophilic one surface of a polymer substrate by treating said one surface of the polymer substrate by a method selected from plasma discharge, plasma, et, flame treatment and acid etching; an opposite surface of the polymer substrate being substantially hydrophobic;
         fixedly attaching, at a number of locations, one surface of a nonwoven material to the one surface of the polymer substrate which has been rendered substantially hydrophilic;
      forming a plurality of sub-modules, each sub-module being formed by the step of:
         fixedly attaching polymer strips between another surface of the nonwoven material, said another surface being opposite to the one surface of the nonwoven material, in one unit and another surface of the nonwoven material in another unit;
      providing channels between an opposite surface of the substrate in one submodule and an opposite surface of the substrate in another submodule; and
      providing channels between one submodule and another submodule.

32. The method of claim 29 wherein the step of fixedly attaching said one surface of the nonwoven material to said one surface of the polymer substrate comprises the steps of:
   disposing, at the number of locations, a thermoplastic material between said one surface of the nonwoven material and said one surface of the polymer substrate; and
   fusion bonding said one surface of the nonwoven material, at the number of locations, to said one surface of the polymer substrate.

33. The method of claim 30 wherein the step of-fixedly attaching polymer strips between said another surface of the nonwoven material in said one unit and said another surface of the nonwoven material in said another unit comprises the steps of disposing adhesive between each one of said at least two polymer strips and said another surface of the nonwoven material in said one unit and said another unit.

34. A method for forming a heat exchanger, the method comprising the steps of:
   forming at least one module by the steps of:
      forming at least two units, each unit from said at least two units being formed by the steps of:
         rendering one surface of a first polymer substrate substantially hydrophilic; another surface of said first polymer substrate being substantially hydrophobic;
         rendering one surface of n second polymer substrate substantially hydrophilic; another surface of said second polymer substrate being substantially hydrophobic;
         disposing a plurality of channels between said another surface of said first polymer substrate and said another surface of said second polymer substrate; said plurality of channels being attached to said another surface of said first polymer substrate and to said another surface of said second polymer substrate;
         fixedly attaching a first substantially compliant nonwoven material at a plurality of locations on said one surface of said first polymer substrate; and
         fixedly attaching a second substantially compliant nonwoven material at another plurality of locations on said one surface of said second polymer material; and
      interposing at least two polymer, strips between two adjacent units from said at least two units such that the two adjacent units are set by the one from another; and
      fixedly securing said at least two polymer strips to each one of the two adjacent units.

35. The method of claim 34 wherein the step of rendering said one surface of the first polymer substrate substantially hydrophilic comprises the step of Corona treating said one surface of the first polymer substrate; and wherein the step of rendering said one surface of the second polymer substrate substantially hydrophilic comprises the step of Corona treating said one surface of the second polymer substrate.

36. A method for forming a heat exchanger, the method comprising the steps of:
   forming at least one module by the steps of
      forming at least two units, each unit from said at least two units being formed by the steps of:
         rendering one surface of a first polymer substrate substantially hydrophilic by treating said one surface of the first polymer substrate by a method selected from plasma discharge, plasma jet, flame treatment and acid etching; another surface of said first polymer substrate being substantially hydrophobic;

rendering one surface of a second polymer substrate substantially hydrophilic by treating said one surface of the second polymer substrate by a method selected from plasma discharge, plasma jet, flame treatment and acid etching; another surface of said second polymer substrate being substantially hydrophobic;

disposing a plurality of channels between said another surface of said first polymer substrate and said another surface of said second polymer substrate; said plurality of channels being attached to said another surface of said first polymer substrate and to said another surface of said second polymer substrate;

fixedly attaching a first substantially compliant nonwoven material at a plurality of locations on said one surface of said first polymer substrate; and fixedly attaching a second substantially compliant nonwoven material at another plurality of locations on said one surface of said second polymer material; and interposing at least two polymer strips between two adjacent units from said at least two units such that the two adjacent units are set by the one from, another; and fixedly securing said at least two polymer strips to each one of the two adjacent units.

37. The method of claim 34 wherein the step of fixedly attaching said first substantially compliant nonwoven material to said one surface of said first polymer substrate comprises the steps of:

disposing, at said plurality of locations, a thermoplastic material between said first substantially compliant nonwoven material and said one surface of said first polymer substrate; and fusion bonding said first substantially compliant nonwoven material, at said plurality of locations, to said one surface of said first polymer substrate;

and wherein the step of fixedly attaching said second substantially compliant nonwoven material, at said another plurality of locations, to said one surface of said second polymer substrate comprises the steps of:

disposing, at said another plurality of locations, a thermoplastic material between said second substantially compliant nonwoven material and said one surface of said second polymer substrate; and fusion bonding said second substantially compliant nonwoven material, at said another plurality of locations, to said one surface of said second polymer substrate.

38. The method of claim 34 wherein the step of fixedly securing said at least two polymer strips to each one of the two adjacent units comprises the steps of disposing adhesive between each one of said at least two polymer strips and said each one of the two adjacent units.

\* \* \* \* \*